(12) United States Patent
Ernst et al.

(10) Patent No.: US 8,520,253 B2
(45) Date of Patent: Aug. 27, 2013

(54) METHOD AND SYSTEM FOR SCALING WITH DOT GAIN CONTROL

(75) Inventors: Larry M. Ernst, Longmont, CO (US); Hong Li, Superior, CO (US); Yue Qiao, Longmont, CO (US); Mikel John Stanich, Longmont, CO (US); Chai Wah Wu, Poughquag, NY (US)

(73) Assignee: InfoPrint Solutions Company, LLC, Boulder, CO (US)

( * ) Notice: Subject to any disclaimer, the term of this patent is extended or adjusted under 35 U.S.C. 154(b) by 2167 days.

(21) Appl. No.: 11/085,161

(22) Filed: Mar. 22, 2005

(65) Prior Publication Data

US 2006/0215186 A1 Sep. 28, 2006

(51) Int. Cl.
*H04N 1/60* (2006.01)

(52) U.S. Cl.
USPC .............................. 358/1.9; 358/1.2; 358/3.07

(58) Field of Classification Search
USPC ......... 358/1.16, 1.2, 1.9, 3.07, 3.23; 345/418
See application file for complete search history.

(56) References Cited

U.S. PATENT DOCUMENTS

| 6,151,025 | A | 11/2000 | Yen et al. | |
|---|---|---|---|---|
| 6,459,430 | B1 * | 10/2002 | Kusumo-Rahardjo et al. | 345/428 |
| 6,836,571 | B1 * | 12/2004 | Hirn | 382/298 |
| 8,295,624 | B2 * | 10/2012 | Coulombe et al. | 382/239 |
| 2002/0097907 | A1 * | 7/2002 | Fukasawa | 382/167 |
| 2003/0071923 | A1 * | 4/2003 | Eskin | 348/674 |
| 2005/0249436 | A1 * | 11/2005 | Chiu et al. | 382/298 |

* cited by examiner

*Primary Examiner* — Dung Tran
(74) *Attorney, Agent, or Firm* — Blakely, Sokoloff, Taylor & Zafman LLP

(57) ABSTRACT

A method (and system) for changing spatial resolution of an image includes systematically creating an image scaling look-up table including at least one pixel replacement pattern and applying a scaling algorithm to modify the image using the image scaling look-up table, thereby allowing a user to scale binary images with easy control of dot gain, output bit depth and other printer parameters.

19 Claims, 8 Drawing Sheets

METHOD AND SYSTEM FOR SCALING WITH DOT GAIN CONTROL

BACKGROUND OF THE INVENTION

1. Field of the Invention

The present invention generally relates to a method and system for scaling binary images, and more particularly to a method and system for changing the spatial resolution of an image by systematically generating a look-up table of pixel replacement patterns. Such a scaling method (and system) allows a user to easily control printer parameters such as dot gain and output bit depth.

2. Description of the Related Art

There are several known techniques for changing the spatial resolution of an image. One such method is referred to as scaling, where one or more pixels of an input image are replaced by one or more other pixels to generate an enhanced output image.

In general, given a scaling factor greater than one, scaling will increase the number of pixels of the input image. This is sometimes called "up-sampling". By the same token, given a factor less than one, scaling will reduce the number of pixels of the input image. This sometimes is called "down-sampling".

There are four main classes of image scaling, which include grayscale-to-grayscale image scaling, binary-to-binary image scaling, binary-to-grayscale image scaling and grayscale-to-binary image scaling. Look-Up-Table (LUT) algorithms are often used for scaling binary images. An input to the LUT includes an index of templates or patterns and the output of the LUT is the templates or patterns themselves which are used for replacing one or more pixels of an image to scale the binary image, denoted as replacement patterns here. Conventionally, both the index patterns and the replacement patterns in the LUT are manually and empirically created based on experiments.

Manually creating patterns empirically determines the patterns by using a trial and error process to create index patterns which capture all of the features in an image, and to create replacement patterns which are visually pleasing and produce a consistent transition from pattern to pattern. In addition, certain exceptions must be recognized such as preserving sharp edges for intersecting lines or preserving fine details such as isolated pixels.

Manually creating the patterns in the LUT is suboptimal and inflexible. That is, the number of manually created patterns is limited. Manually creating patterns assumes a given boldness or dot gain which cannot be adjusted to account for printer characteristics or changes in printer characteristics, thus producing a suboptimal and inflexible solution. Furthermore, some features of the binary image may be missed due to the limited number of index patterns and replacement patterns. This is due to the limited number of experiments that are normally performed in the manual techniques.

Another important consideration when scaling binary images is control of printer parameters, such as dot gain and output bit depth. Conventional binary image scaling methods require the user to manually create a set of patterns for each printer dot gain and for each output bit depth. These methods are also inflexible and inefficient, in terms of hardware implementation.

U.S. Pat. No. 6,151,025, incorporated herein by reference, describes a method of performing scaling of binary images by storing linear combinations of a row of pixels in a LUT. Several LUTs are needed for each level of dot gain. At runtime, several LUT operations are needed and the results are combined to determine the output.

Additionally, conventional image scaling methods require stored sets of patterns for specific fixed scaling ratios. Thus, in the conventional techniques, different scaling ratios require different sets of LUT's.

SUMMARY OF THE INVENTION

In view of the foregoing and other exemplary problems, drawbacks, and disadvantages of the conventional methods and structures, an exemplary feature of the present invention is to provide a method (and system) for altering the spatial resolution of an image by systematically creating pixel replacement patterns and storing them in a multibit look-up table. For purposes of the present invention, the term look-up table is meant to include any memory structure that is accessed or indexed by an address. This can include computer memory arrays, hash tables or any collection of data whose individual datum can be retrieved or changed by supplying an index or an address.

In a first aspect of the present invention, a method (and system) for changing the spatial resolution of an image, includes systematically creating an image scaling look-up table (i.e., the output of the LUT could be a binary pattern or a pattern of multibit gray levels) and applying a scaling algorithm to modify the image, using the look-up table. The image scaling look-up table may be one of a binary look-up table and a multibit look-up table.

In a second aspect of the present invention, a method (and system) for creating an image scaling look-up table, includes systematically creating a replacement pattern for a pixel of the image and storing the replacement pattern in the look-up table.

In a third aspect of the present invention, a method (and system) for changing spatial resolution of an image, includes applying a scaling algorithm to an image to be modified, obtaining a pixel replacement pattern from a multibit look-up table, replacing a pixel of the image to be modified with the pixel replacement pattern and converting the pixel replacement pattern to a binary replacement pattern.

In a fourth aspect of the present invention, a method (and system) for non-integer scaling of an image, includes systematically creating a first multibit look-up table including at least one pixel replacement pattern, based on a first approximate integer scaling ratio for a first direction and a first approximate integer scaling ratio for a second direction, systematically creating a second multibit look-up table including at least one pixel replacement pattern, based on a second approximate integer scaling ratio for a first direction and a first approximate integer scaling ratio for a second direction, and applying a scaling algorithm to modify the image, using the first look-up table and the second look-up table.

In a fifth aspect of the present invention, a computer system for scaling an image, includes means for systematically creating a multibit look-up table including at least one pixel replacement pattern and means for applying a scaling algorithm to modify the image, using the look-up table.

In a sixth aspect of the present invention, a signal-bearing medium tangibly embodying a program of machine readable instructions executable by a digital processing apparatus to perform a method for scaling an image, includes systematically creating a multibit look-up table including at least one pixel replacement pattern and applying a scaling algorithm to modify the image using the look-up table.

In a seventh aspect of the present invention, a method for deploying computing infrastructure, includes integrating computer-readable code into a computing system, wherein the computer readable code in combination with the computing system is capable of performing a method for changing spatial resolution of an image, wherein the method for changing spatial resolution of an image includes systematically creating a multibit look-up table including at least one pixel replacement pattern and applying a scaling algorithm to modify the image using the look-up table.

In a eighth aspect of the present invention, a computer system for scaling an image, includes an LUT creating unit for systematically creating a multibit look-up table including at least one pixel replacement pattern and a LUT scaling unit for applying a scaling algorithm to modify the image, using the look-up table.

Unlike conventional scaling methods (and systems) discussed above, the present invention allows a user to systematically generate patterns for a look-up table-based algorithm for scaling binary images. The present invention also provides a way to scale binary images with easy control of dot gain and output bit depth without having to generate different LUTs for different levels of dot gain and output bit depths.

Additionally, the method of the present invention can determine the patterns for virtually any scaling ratio using a single LUT or multiple LUTs by approximating an arbitrary ratio using a sequence of fixed ratios operating on blocks of pixels.

Finally, the present invention provides a method (and system) for easily and systematically scaling binary images by a non-integer scaling factor.

Thus, the present invention enables improved flexibility and parameter control during the scaling of binary images.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1B:
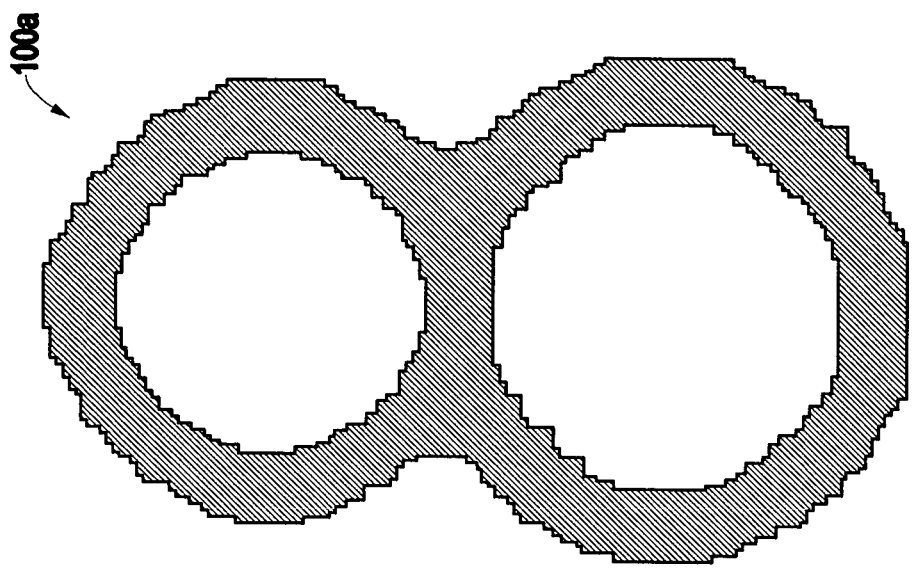
FIGS. 1A and 1B respectively illustrate an exemplary binary image 100 and the image 100 after processing by the present invention.

Referring now to the drawings, and more particularly FIGS. 1-10, there are shown exemplary embodiments of the methods and structures according to the present invention.

As mentioned above, the present invention provides a method (and system) for scaling binary images that solves several problems of the conventional scaling methods.

One exemplary embodiment of the present invention provides a systematic method (and system) for generating templates and patterns for a pattern matching-based or a LUT-based algorithm for scaling binary images.

Another exemplary embodiment of the present invention provides a method (and system) for scaling binary images using a LUT-based algorithm.

An additional embodiment of the present invention provides a method (and system) for easily scaling binary images using non-integer scaling ratios. The exemplary embodiments of the present invention provide methods and systems which are flexible and efficient while exhibiting improved control of printer parameters, such as dot gain, output depth bit, etc.

In a LUT-based algorithm for scaling-up or scaling-down binary images, some exemplary steps include (see FIG. 10) obtaining a replacement pattern in a Region of Replacement (ROR) 1001 which replaces a current pixel or a current block of pixels in a Region of Modification (ROF) 1002. The ROR is defined in the output image space, whereas the ROF is defined in the input image space. The replacement pattern obtained from the LUT is dependent on the "neighborhood" of the current pixel or pixels to be replaced. This neighborhood defines a Region of Interest (ROI) 1003, which is defined in the input image space. Since the ROI is usually larger than that of the ROF, the pixels adjacent, including pixels not immediately adjacent, to the ROF can affect the selection of the pixel replacement pattern.

For the special case where the ROF is a single pixel, a "neighborhood" of the current pixels represents a surrounding area of the current pixel. As stated above, the neighborhood defines the ROI, whereas the current pixel represents the ROF.

This process of pixel replacement is then iterated for each pixel or blocks of pixels of the original image. For non-integer scaling, multiple LUTs may be needed and the size of the ROF and the ROR may vary with position in the input image.

For example, a 2×2 pixel ROR block of replacement pixels could be used for a 240 dpi (dots per inch) to 600 dpi resolution conversion for all of the pixels in the odd row and odd column input image pixels. A 3×3 pixel ROR block of replacement pixels would be used for the pixels in the image which fall on even rows and columns. A 3×2 (vertical×horizontal) pixel ROR block of replacement pixels would be used for the pixels in the image which fall on the even rows and odd columns. A 2×3 (vertical×horizontal) pixel ROR block of replacement pixels would be used for the pixels in the image which fall on the odd rows and even columns. In this case, the ROF is a single pixel.

Figure 11:
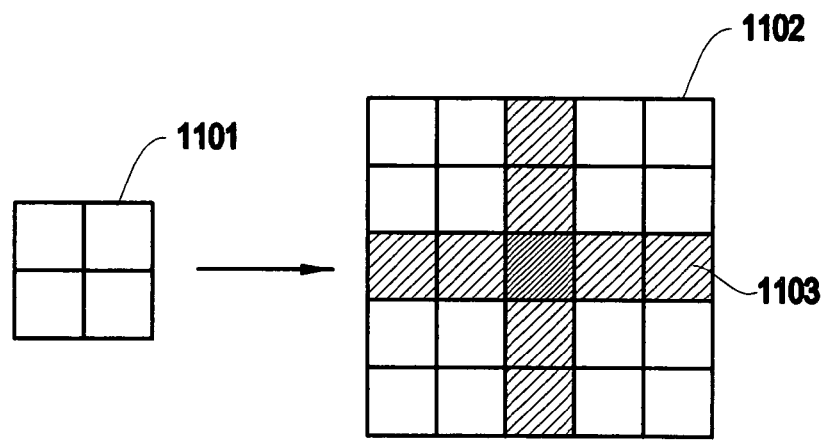
FIG. 11 illustrates the various regions for an exemplary embodiment of scaling a 240 dpi image to 600 dpi.

In addition, there may be pattern overlaps depending on the pixel position. That is, the block defined by the replacement pixels (ROR) is larger than the ROF of the image, when the ROF is expressed in the output image device space. In this case, the overlapping pixels can be logically compared to determine the final replacement pixels. In the previous 240 dpi to 600 dpi example, a single LUT with a 3×3 ROR could be used where the inclusive OR operation is applied to the overlapped pixels. For this case, the ROR are shifted slightly for each of the four cases. This is illustrated in FIG. 11 where each single pixel in a 2×2 block 1101 is a ROF. Each of these 4 pixels is mapped to a 3×3 block which overlaps forming a 5×5 block 1102 of pixels. The overlapped pixels 1103 are represented by the shaded pixels in FIG. 11.

In order to generate the LUT, the patterns are determined by first scaling the image naively (e.g., for purposes of the present invention "naively" means using a simple "nearest neighbor" or "double dot" scaling algorithm, both of which are well known in the art). Then, the image is blurred using an appropriate (possibly human visual system based) blurring or interpolation function, and then thresholding or halftoning is applied. For down-sampling (i.e., scaling factor <1), the blurring step may be omitted.

According to one exemplary embodiment of the present invention, the thresholding or halftoning step is applied at the time that the scaling algorithm is applied, thereby allowing more flexibility in the effect of the algorithm to control features such as dot gain and output bit depth. The resulting image is then provided to a single-bit printer or multi-bit printer. In this case, the output of the LUT is a pattern with multibit values.

For multi-bit printers or display devices, the step of thresholding or halftoning can be skipped and the contone data can be provided directly to the device, or multi-bit halftoning can be used.

Figure 1A:
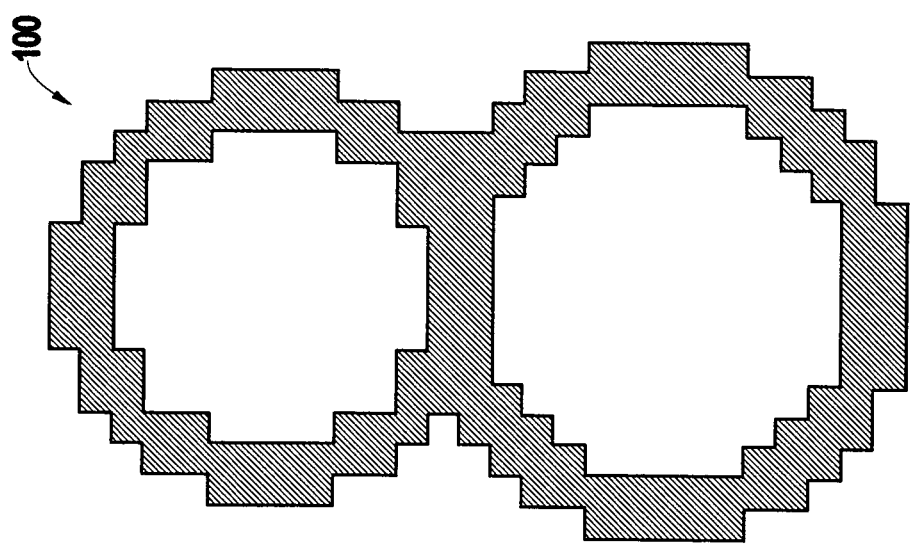

Turning now to the drawings, FIG. 1A illustrates a sample of a binary image 100 to be scaled by the method (and system) of an exemplary embodiment of the present invention, and FIG. 1B illustrates the image of FIG. 1A after processing by the inventive method. Specifically, FIG. 1A illustrates a binary image 100 of the number "8" at 240 dpi. FIG. 1B illustrates a scaled image 100a of the binary image of FIG. 1A scaled-up 5 times to 1200 dpi.

Figure 2:
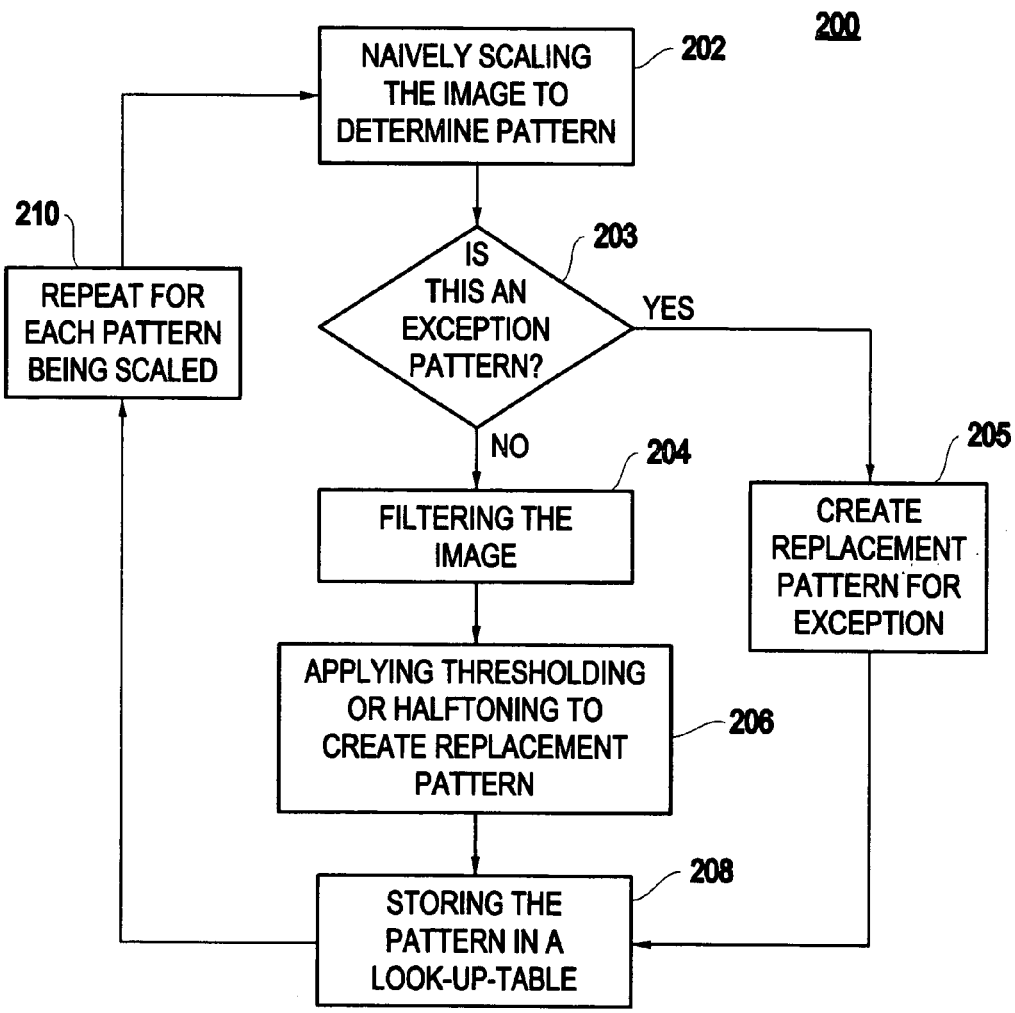
FIG. 2 is a flow diagram illustrating a method 200 for creating a binary image scaling LUT according to an exemplary embodiment of the present invention.

FIG. 2 depicts a method 200 for creating a LUT for scaling binary images according to an exemplary embodiment of the present invention.

As shown in FIG. 2, an input image is scaled using a "simple" or "naïve" scaling algorithm (step 202) to determine a replacement pattern for a pixel of the input image (or the image to be scaled). There are several techniques for simply scaling an image, including, but not limited to, "nearest neighbor", "double-dotting", "bicubic interpolation", etc. (each of which is well-known in the art).

As discussed above, the replacement pattern in the LUT is determined based on the neighborhood of the pixel or pixels being replaced. The pattern in the neighbor mask of the input (original) image (ROI) is used to index the LUT. Usually, the ROI is larger than the ROF and a neighborhood is formed around the ROF. This allows the pixels adjacent, including pixels not immediately adjacent, to the ROF to affect the selection of the pixel replacement pattern.

It is then determined if the pattern is an exception pattern (step 203). It is often desirable for certain features to be preserved during the image scaling process. These preserved features are referred to as "exceptions". These exceptions include, but are not limited to, the position of single, isolated pixels, line intersections, etc. If the pattern is an exception pattern, then an exception replacement pattern is created (step 205) and the exception replacement pattern is stored in the LUT (step 208). If the pattern is not an exception pattern, then the process 200 continues.

As mentioned, if "No" in step 203, the image is then filtered (step 204) using an appropriate (possibly human visual system-based) filtering function. Several filtering functions are known including, but not limited to, blurring, interpolation filtering, low-pass filtering, erosion and dilation. The filtering process smoothes the image after it has been scaled using a simple scaling algorithm. The filtering process converts the image into a "gray scale" image, or multibit image. It is necessary to smooth the image because during scaling-up or extrapolation of the image using the simple scaling methods mentioned above, "staircasing" occurs along the edges of the image. The filtering process removes the staircasing to obtain straight, smooth image lines.

Then, thresholding or halftoning is applied (step 206) to the blurred multibit image. Halftoning is a process for converting the multibit images into binary images. Any one of several halftoning processes, including applying a threshold array, error diffusion, Direct Binary Search halftoning or thresholding may be used to convert the multibit images. Other image processing steps can be applied such as erosion or dilation to further control boldness in the output image. Thresholding is a process by which pixels are rounded either up to binary 1 or down to binary 0 based on comparing the gray-level value to the threshold value. The threshold value may be altered to achieve a different boldness in the output image. Similarly, the thresholding and error calculation in error diffusion can be adjusted to achieve a different boldness.

The resulting binary pattern is then stored in the LUT (step 208). This process is then repeated for each pattern in the ROI being scaled in the input image (step 210).

Figure 3:
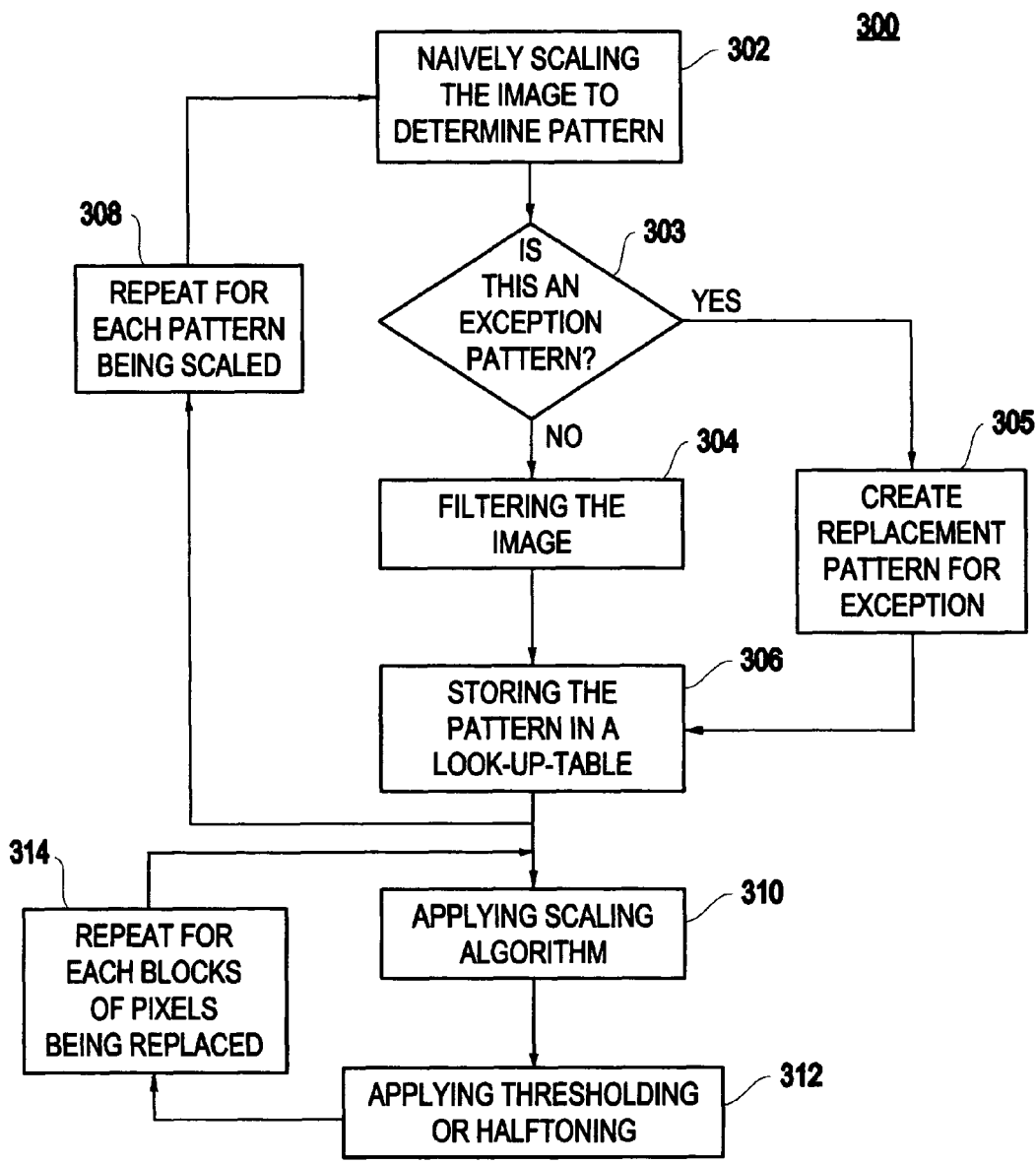
FIG. 3 is a flow diagram illustrating a method 300 for scaling a binary image according to an exemplary embodiment of the present invention.

FIG. 3 is a flow diagram illustrating a method 300 for changing the spatial resolution of an image through scaling using a LUT-based algorithm according to an exemplary embodiment of the present invention.

In this embodiment, a LUT is created (e.g., as exemplarily described above with regard to the method of FIG. 2) and then applied to an image. To create the LUT, the image is naively scaled to determine the pattern (step 302).

It is then determined if the pattern is an exception pattern (step 303). If the pattern is an exception pattern, then an exception replacement pattern is created (step 305) and the exception replacement pattern is stored in the LUT (step 306). If the pattern is not an exception pattern, then the process 300 continues to step 304.

Next, the pattern is filtered (step 304), using any of the known filtering processes discussed above, or processed. As opposed to the previous embodiment, the patterns are not converted to binary patterns at this point. The thresholding or halftoning is not applied until the scaling algorithm is applied, because applying the thresholding or halftoning when the scaling algorithm is applied allows for more flexibility and control over the printing parameters. The multibit patterns are stored in a multibit LUT (step 306). This process is continued for each pattern in the ROI in the input image (step 308) until the LUT is complete.

Once the LUT (step 306) is completed, a scaling algorithm is obtained by iteratively considering (step 310) the pixel or block of pixels in the ROF, i.e. the pixels that are being replaced. Depending on the neighborhood (e.g., the adjacent pixels) of the current pixel or block of pixels, a pattern in the ROR is obtained which replaces the current pixel (or block of pixels) in the ROF.

At this time, thresholding or halftoning is applied to the replacement pattern (step 312) to convert the multibit pattern to a binary pattern. Applying the thresholding or halftoning at the time that the scaling algorithm is applied allows for more flexibility in the effect of the algorithm to control parameters such as dot gain and output bit depth without the need to create a different LUT for different dot gain or output bit depth. For instance, by changing the threshold value, the same LUT can be used to scale images with different dot gain. The algorithm 310 and the thresholding or halftoning (step 312) are iterated for each pixel or block of pixels in the ROF of the input image (step 314).

Figure 4:
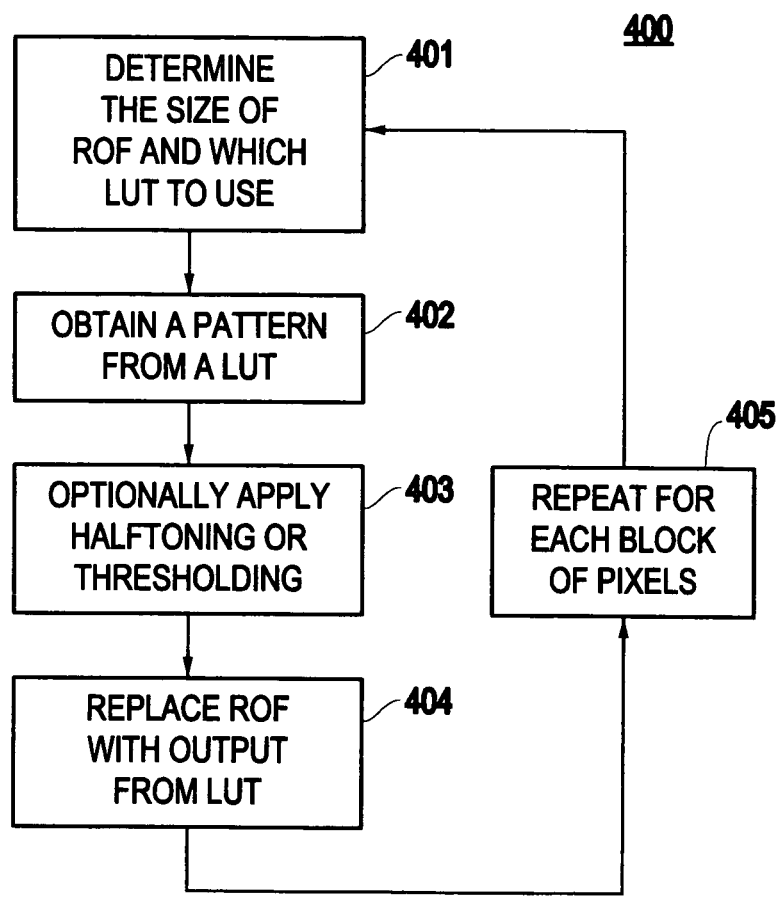
FIG. 4 is a flow diagram illustrating a method 400 for non-integer scaling a binary image according to an exemplary embodiment of the present invention.

FIG. 4 depicts a method 400 for scaling an image using complicated, non-integer scaling ratios, according to another exemplary embodiment of the present invention. In this embodiment, at least one binary LUT is created and then applied to an image. More specifically, in this embodiment the at least one binary LUT includes at least two separate LUTs (e.g., similar to those produced by the method of FIG. 2) are created and then applied to an input image. However, any number of LUTs may be used.

Each LUT is created by the same general process (see FIG. 2 or FIG. 3). First, the size of the block to be replaced (ROF) and which LUT out of the set of multiple LUT's to use are determined (step 401). For instance, in an exemplary embodiment for 240 dpi to 600 dpi scaling discussed above, where the scaling factor is 2.5, the ROF is a single pixel and 4 LUTs are used (the present invention is not limited to using 4 LUTs, and any suitable number of LUTs, for instance, 2 or more, may be used), depending on whether the current pixel is at an even or odd row and an even of odd column. Then the ROI is used to index this LUT to determine the pattern in the ROR (step 402). If the LUTs are created according to FIG. 3, then halftoning or thresholding is applied to the output of the LUT (step 403). The output of the LUT is used to replace the pattern in the ROF (step 404). These steps are repeated for each pixel (or blocks of pixels) in the input image (step 405).

For more complicated scaling factors, the sequence of which the LUT to apply can be obtained by using an error diffusion algorithm, similar to the sequence or ratios obtained in T. Nowicki, J. Q. Trelewicz, M. Martens, T. Trenary, "Error Diffusion Method for Resampling in the Transform Domain", IBM Research Report RJ10249, 2002.

Figure 5:
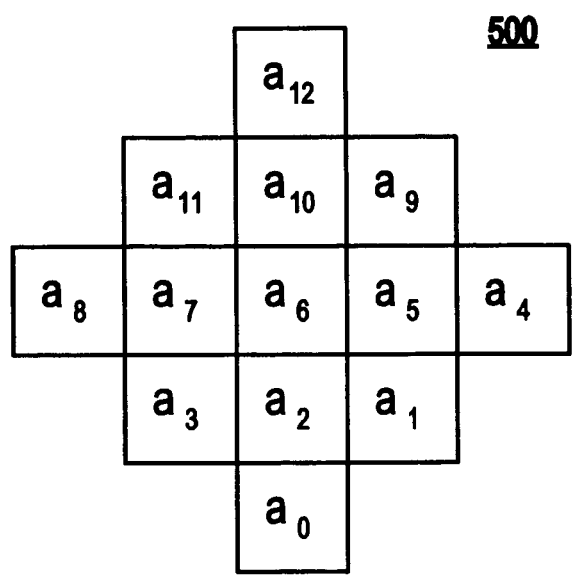
FIG. 5 is a schematic diagram illustrating an exemplary neighborhood mask 500 of an original image according to the present invention.

FIG. 5 illustrates an exemplary 5-3-1 shaped neighborhood mask of the input image. Any other suitable mask/matrix may be used (including rectangular masks). However, the 5-3-1 mask provides increased information while decreasing the required storage space. In general, as the size of the neighborhood increases, the size of the LUT increases which then increases the amount of memory needed for the LUT. The 5-3-1 mask also allows the user to modify more than one pixel at a time.

In this exemplary embodiment, since the neighborhood of the ROI has 13 elements, the LUT file contains 8192 ($=2^{13}$) N-bit words. The address for each word is derived by the binary pattern data for the 5-3-1 mask. The N-bit data at each location in the LUT describes the patterns which are substituted for the center pixel or pixels when the pattern for that address is encountered.

For example, if the binary scaling is from 240 dpi to 1200 dpi (scaling factor of 5), then N=5×5=25. Therefore, in this case, each single pixel will be replaced by a 5×5 matrix of pixels. Thus, the output from the LUT will be a 5×5 pixel pattern for each single pixel of the input image.

The 5-3-1 matrix values in the above matrix $a_{12}$ through $a_0$ are used to determine the location where the replacement pattern is stored in the LUT, where $a_{12}$ is the most significant bit (MSB) part of the address and $a_0$ is the least significant bit (LSB) part of the address. It is clear that any other assignment of bits is also applicable, and the present invention is not limited to this exemplary assignment. Pixels (PELs) which are black are considered binary "1" when forming the address and PELs which are white are binary "0". The N bit word stored in the LUT at this address is used to replace the center pixel, which is located at $a_6$, in the lower resolution data with higher resolution (enhanced) data. Any arrangement of data can be used for the N bit data.

For example, the first bit (MSB) corresponds to the upper left pixel for the higher resolution pattern data and the last bit (LSB) corresponds to the lower right pixel for the higher resolution pattern data.

For a case where contone data is stored in the LUT (see FIG. 3), the N bits are replaced by N bytes or m-bit words of data. The binary replacement patterns are determined by comparing the contone data to the threshold value, which is selected for the desired boldness. Halftoning, including error diffusion, is optionally applied to convert the contone data to binary.

In a case where arbitrary scaling factors are used, LUTs for several simple scaling factors are constructed and arbitrary scaling factors are achieved by repeating these simple scaling factors on blocks of pixels in a periodic or a periodic sequence. The sequence can be obtained using error diffusion or other types of halftoning algorithms.

Figure 6:
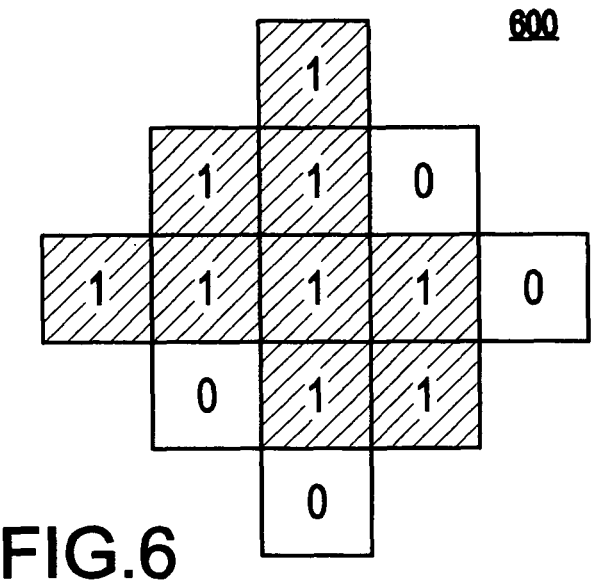
FIG. 6 is a schematic diagram illustrating an exemplary pattern 600 in the neighborhood mask (ROI) of the original image according to the present invention.

FIG. 6 illustrates another example of a pixel replacement pattern. For this example, the address of the pattern in the LUT would be binary 1,1101,1110,0110. The replacement pattern when this pattern is decoded would be the N bits of data stored in the LUT at address 7654 (binary 1,1101,1110, 0110).

As an example, to create the pattern corresponding to FIG. 6 to be stored in the LUT, the image in FIG. 6 is scaled by the desired amount (i.e. a scaling factor of 5 if scaling up from 240 dpi to 1200 dpi). This image is then blurred by an appropriate blurring function, for example a Gaussian blur function, but other functions which take into account the human visual system can also be used. For instance, an anisotropy coefficient can be used to make the blurring less in the diagonal directions than in the horizontal or vertical directions.

The resulting image corresponding to the center pixel is then thresholded to create the binary replacement pattern. Based on different input patterns in the 5-3-1 mask, threshold values could be different for optimal image quality. An alternative is to use digital halftoning such as error diffusion or a blue noise dither mask to create the binary replacement pattern, or in the case of multibit output the contone data would be maintained as part of the replacement pattern.

The step of thresholding and digital halftoning can be optionally deferred to the point when the algorithm is applied to perform scaling. This allows the threshold to be adjustable at runtime and is more flexible in terms of possible parameters, and enables the adjustment of dot gain or output bit depth at runtime. In the case of non-integer scaling, as discussed above, multiple LUTs are created, and the replacement patterns may be overlapped depending on the pixel position. In the case of 240 dpi to 600 dpi conversion (non-integer scaling), a 2×2 block pixel of an input image is studied, if a 3×3 replacement pattern is used for each of the 4 pixels of the 2×2 block, overlap between the four 3×3 replacement patterns may be done in order to achieve the 240 dpi to 600 dpi conversion. Overlapping in this case refers to the Region of Replacement (ROR) for each of theses four cases which are slightly displaced for each substitution case (the upper left, upper right, lower left and lower right pixels in the 2×2 block of the original data).

Figure 7:
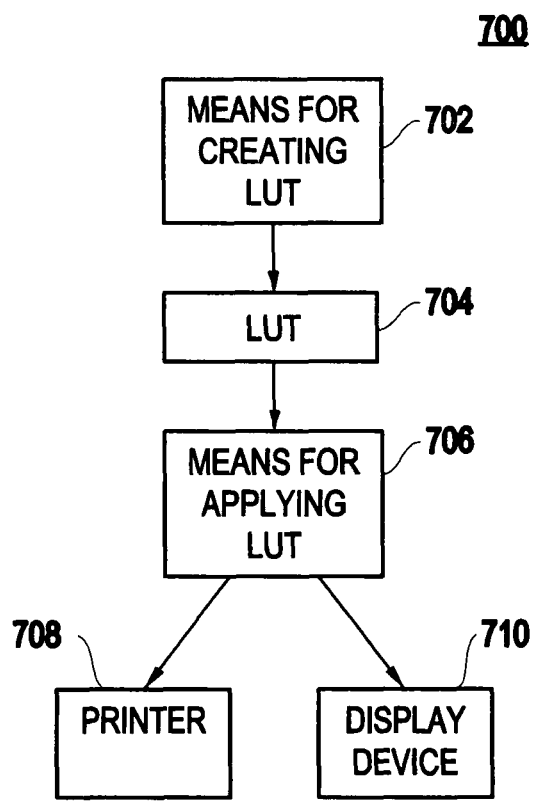
FIG. 7 illustrates a block diagram of a system 700 for scaling a binary image according to an exemplary embodiment of the present invention.

FIG. 7 depicts a system 700 for changing the spatial resolution of a binary image through scaling. The system includes a unit for creating 702 an LUT, a LUT 704, a unit for applying 706 the LUT, a printer 708 and a display device 710. Once the LUT 704 is created, it is applied to an input image. Once the input image is scaled, the scaled or output image is delivered to either the printer 708 or to the display device 710.

Figure 8:
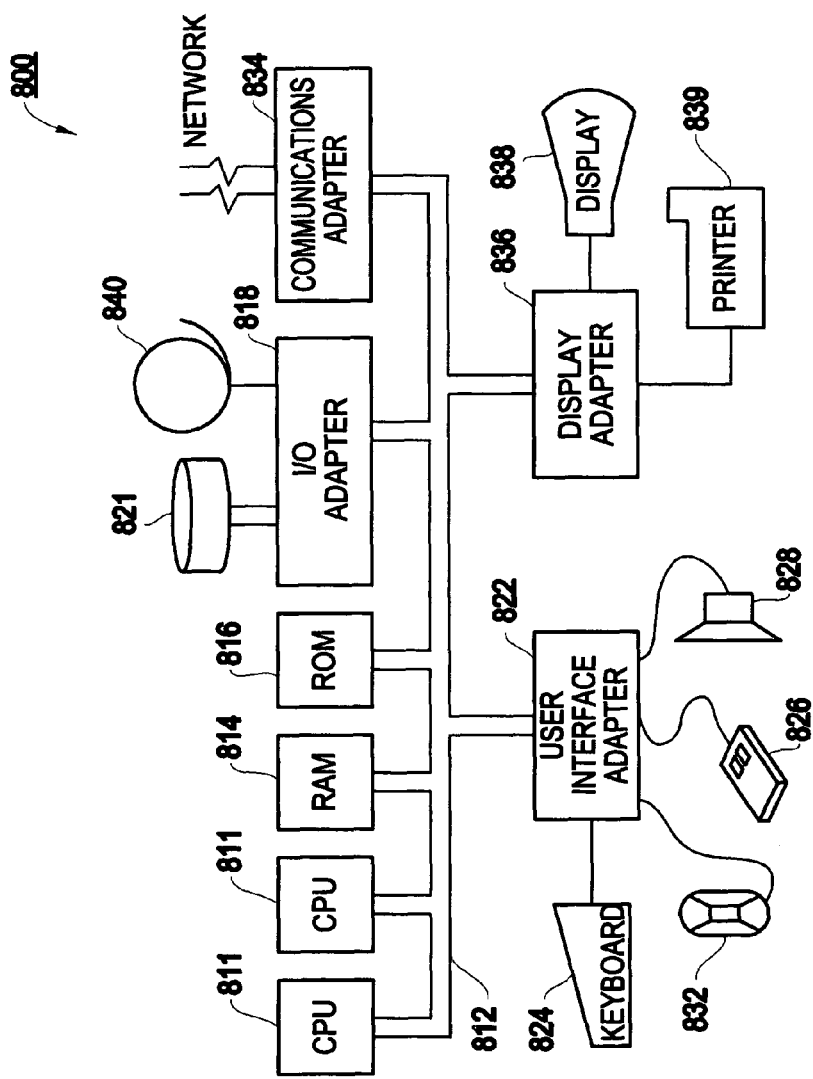
FIG. 8 illustrates a block diagram of the environment and configuration of an exemplary system 800 for incorporating the present invention.
Figure 9:
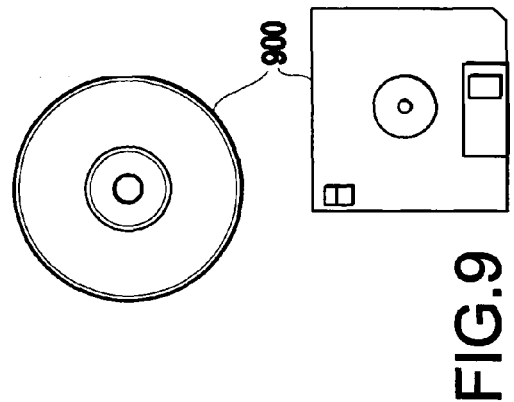
FIG. 9 illustrates a storage medium 900 for storing steps of the program for scaling a binary image according to the present invention.
Figure 10:
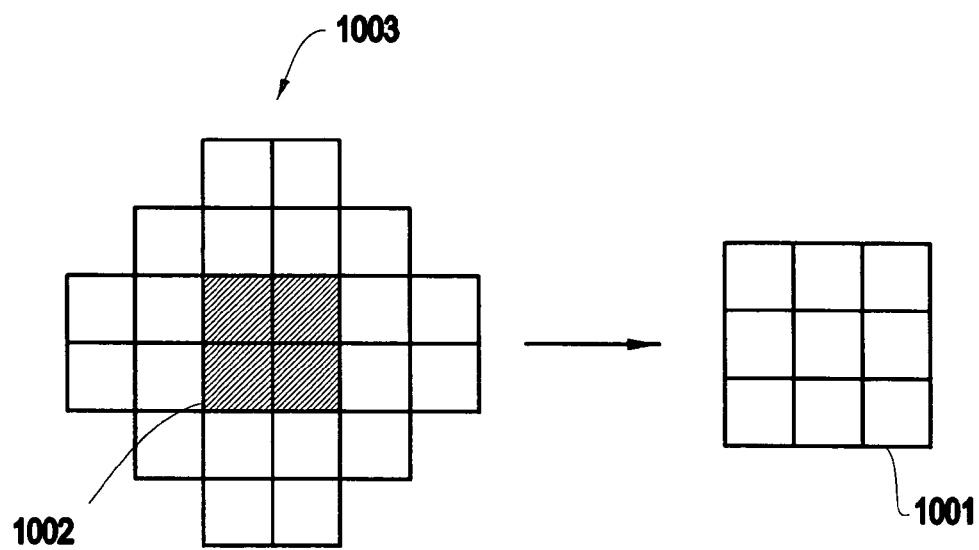
FIG. 10 illustrates the various regions for an exemplary image to be scaled according to the present invention.

FIG. 8 shows a typical hardware configuration of an information handling/computer system in accordance with the invention that preferably has at least one processor or central processing unit (CPU) 811. The CPUs 811 are interconnected via a system bus 812 to a random access memory (RAM) 814, read-only memory (ROM) 816, input/output adapter (I/O) 818 (for connecting peripheral devices such as disk units 821 and tape drives 840 to the bus 812), user interface adapter 822 (for connecting a keyboard 824, mouse 826, speaker 828, microphone 832, and/or other user interface devices to the bus 812), communication adapter 834 (for connecting an information handling system to a data processing network, the Internet, an Intranet, a personal area network (PAN), etc.), and a display adapter 836 for connecting the bus 812 to a display device 838 and/or printer 839 (e.g., a digital printer or the like).

As shown in FIG. 8, in addition to the hardware and process environment described above, a different aspect of the invention includes a computer implemented method of performing a the inventive method. As an example, this method may be implemented in the particular hardware environment discussed above.

Such a method may be implemented, for example, by operating a computer, as embodied by a digital data processing apparatus to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 811 and hardware above, to perform the method of the present invention.

This signal-bearing media may include, for example, a RAM (not shown) contained with the CPU 811, as represented by the fast-access storage, for example. Alternatively, the instructions may be contained in another signal-bearing media, such as a magnetic data storage diskette or CD disk 900 (FIG. 9), directly or indirectly accessible by the CPU 811.

Whether contained in the diskette 900, the computer/CPU 811, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc), or other suitable signal-bearing media including transmission media such as digital and analog and communication links and wireless. In an illustrative embodiment of the invention, the machine-readable instructions may comprise software object code, compiled from a language such as "C", etc.

As discussed above in an exemplary preferred embodiment of the present invention, the method and system for scaling of a binary image provide image scaling through binary image scaling. By enabling the systematic creation of pixel replacement patterns that are stored in an LUT, the present invention provides a method and system of changing the spatial resolution of an image that is more flexible and efficient by eliminating the need to manually create LUTs and the patterns stored therein. Furthermore, unlike conventional scaling methods, the present method and system allows a user to easily control printer parameters such as dot gain and output bit depth.

While the invention has been described in terms of several exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

What is claimed is:

1. A method for changing a spatial resolution of an image, comprising:
    creating an image scaling look-up table comprising at least one pixel replacement pattern, by:
        scaling the image using a first scaling algorithm to determine said at least one pixel replacement pattern; and
        storing said at least one pixel replacement pattern in said look-up table; and
    applying a second scaling algorithm to modify the image using said look-up table.

2. The method according to claim 1, wherein said creating an image scaling look-up table further comprises:
    applying an image processing operation to said at least one pixel replacement pattern.

3. The method according to claim 2, wherein said image processing operation comprises at least one of filtering, erosion and dilation.

4. The method according to claim 1, further comprising:
    converting said at least one pixel replacement pattern to a binary image.

5. The method according to claim 4, wherein said converting said at least one pixel replacement pattern comprises at least one of thresholding said at least one pixel replacement pattern and halftoning said at least one pixel replacement pattern.

6. The method according to claim 1, wherein said applying a scaling algorithm comprises:
    obtaining said at least one pixel replacement pattern from said image scaling look-up table; and
    replacing a pixel of the image with said at least one pixel replacement pattern.

7. The method according to claim 2, further comprising:
    converting said at least one pixel replacement pattern to a binary image.

8. The method according to claim 6, further comprising:
    converting said at least one pixel replacement pattern to a binary image.

9. The method according to claim 2, further comprising:
    repeating said scaling the image, applying an image processing operation to said at least one pixel replacement pattern, and storing said at least one pixel replacement pattern for each pixel in the input image.

10. The method according to claim 6, further comprising:
    repeating said obtaining said at least one pixel replacement from said image scaling look-up table, and replacing a pixel of the image with said at least one pixel replacement pattern for each pixel in the image.

11. The method according to claim 1, further comprising:
    preserving predetermined features of the image.

12. The method according to claim 1, wherein said image scaling look-up table comprises at least one of a binary look-up table and a multibit look-up table.

13. The method for changing a spatial resolution of an image, according to claim 1, wherein said creating an image scaling look-up table comprising at least one pixel replacement pattern, comprises:
    creating a replacement pattern for a pixel of the image; and
    storing said replacement pattern in the image scaling look-up table.

14. A method for non-integer scaling of an image, comprising:

creating a first image scaling look-up table comprising at least one pixel replacement pattern, based on a first approximate integer scaling ratio for a first direction and a first approximate integer scaling ratio for a second direction;

creating a second multibit look-up table comprising at least one pixel replacement pattern, based on a second approximate integer scaling ratio for a first direction and a second approximate integer scaling ratio for a second direction; and applying a scaling algorithm to modify the image alternately using said first look-up table and said second look-up table, wherein creating the first and second look-up tables includes:

scaling an image to determine the at least one pixel replacement pattern; and storing said at least one pixel replacement pattern.

15. The method according to claim 14, further comprising:

creating a third multibit look-up table comprising at least one pixel replacement pattern, based on a third approximate integer scaling ratio for a first direction and a third approximate integer scaling ratio for a second direction; and applying a scaling algorithm to modify the image alternately using said first look-up table, said second look-up table and said third look-up table.

16. A computer-readable medium tangibly embodying a program of machine readable instructions executable by a digital processing apparatus to perform a method for scaling an image according to claim 1.

17. A method for deploying computing infrastructure, comprising integrating computer-readable code into a computing system, wherein the computer readable code in combination with the computing system is capable of performing a method for changing spatial resolution of an image according to claim 1.

18. The method according to claim 6, further comprising:

repeating said obtaining said pixel replacement from said image scaling look-up table, and replacing a pixel of the image with said pixel replacement pattern for each pixel in the image, wherein the replacement patterns define a region in the output device space larger than the region being replaced in the input device space.

19. A computer system for scaling an image, comprising:

a creation unit that creates an image scaling look-up table comprising at least one pixel replacement pattern, by:

scaling the image using a first scaling algorithm to determine said at least one pixel replacement pattern; and storing said at least one pixel replacement pattern in said look-up table; and applying a second scaling algorithm to modify the image using said look-up table.

* * * * *